No. 886,485. PATENTED MAY 5, 1908.
F. B. ESPY.
PIG FEEDER.
APPLICATION FILED DEC. 20, 1907.
2 SHEETS—SHEET 1.
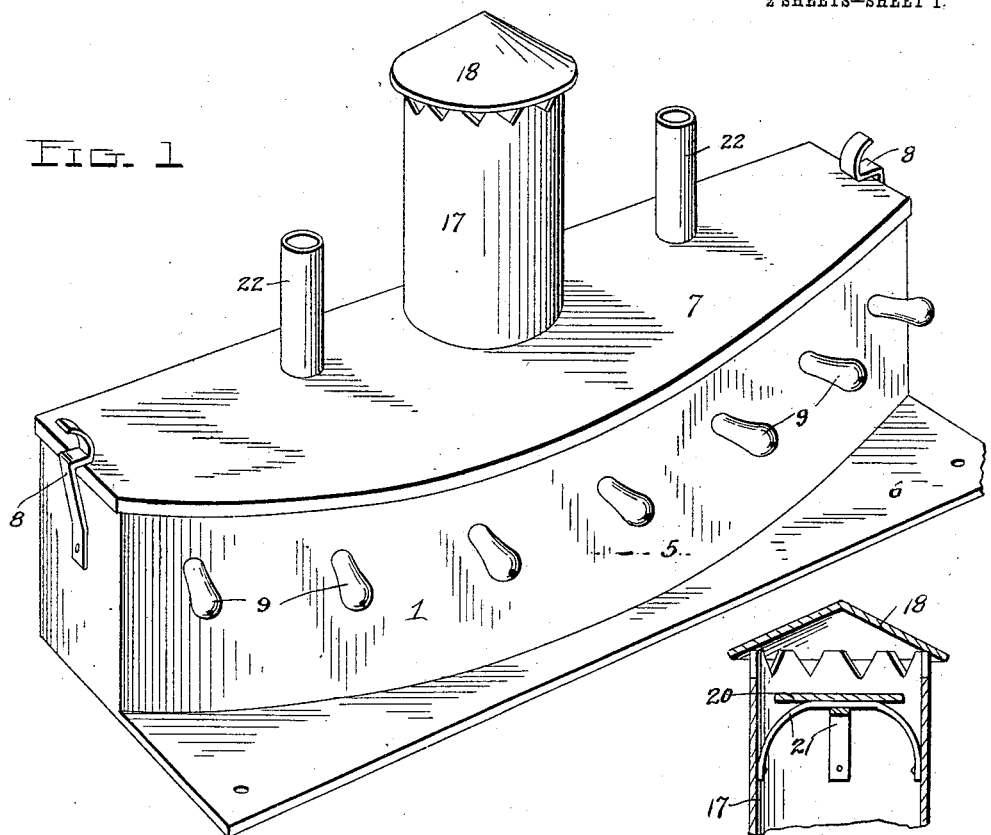
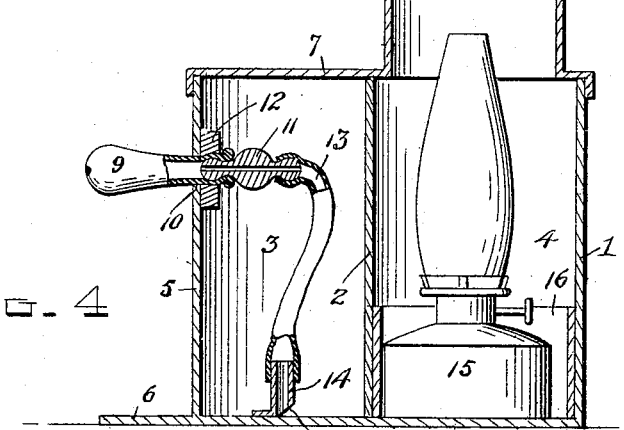
Witnesses
Chas. K. Griesbauer
L. O. Little
Inventor
Frances Belle Espy
By Watson E. Coleman
Attorney

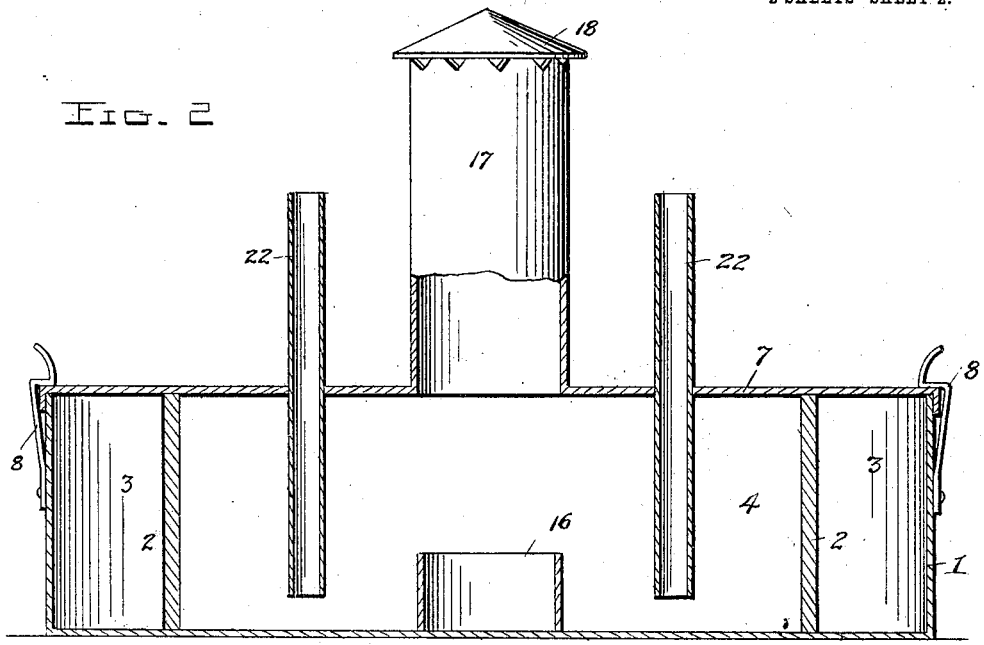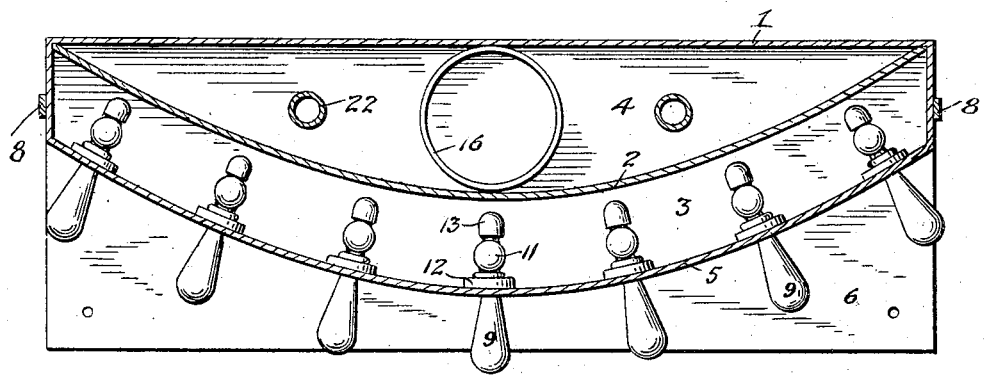

UNITED STATES PATENT OFFICE.

FRANCES BELLE ESPY, OF CESTOS, OKLAHOMA.

PIG-FEEDER.

No. 886,485.  Specification of Letters Patent.  Patented May 5, 1908.

Application filed December 20, 1907. Serial No. 407,331.

*To all whom it may concern:*

Be it known that I, FRANCES BELLE ESPY, a citizen of the United States, residing at Cestos, in the county of Dewey and State of Oklahoma, have invented certain new and useful Improvements in Pig-Feeders, of which the following is a specification, reference being had to the accompanying drawings.

My invention relates to improvements in feeders for pigs or other young animals, and it consists of the novel features of construction and the combination of parts hereinafter described and claimed.

The object of the invention is to provide a device of this character which will be simple and practical in construction and very effective in accomplishing its intended purpose.

The above and other objects of the invention are attained in its preferred embodiment illustrated in the drawings, in which Figure 1 is a perspective view of my improved pig feeder; Fig. 2 is a vertical longitudinal section; Fig. 3 is a horizontal section; and Fig. 4 is a vertical transverse section.

My improved pig feeder comprises a body 1 of any suitable form divided by a partition 2 into a milk or feed chamber 3 and a heating chamber 4. The body 1 is preferably of substantially rectangular form and has its front side wall 5 bowed or curved outwardly from end to end. The partition 2 as shown extends vertically and longitudinally and is also bowed or curved as shown in Fig. 3. The body is preferably arranged upon a base 6 which may be suitably secured upon a floor or ground so as to prevent the device from being shifted or overturned. The top of the body is open and is adapted to be closed by a removable cover 7 having a surrounding depending flange to fit over the upper edges of the walls of the body 1, upon which latter said cover is retained by spring catches 8 arranged preferably at the ends of the body and constructed as more clearly shown in Fig. 2.

The milk within the chamber or compartment 3 is fed to the little pigs by nipples 9 which project outwardly from the front wall or side 5 of the body. Any number of these nipples may be provided and they are preferably arranged in a horizontal row at a suitable distance apart and at a suitable distance from the base 6. These nipples are preferably constructed of rubber and are removably arranged in apertures 10 formed in the wall 5. In the inner end of each nipple is inserted one of the enlarged ends of a connecting tube or coupling 11 which is retained in the nipple by a washer or ring 12 surrounding the inner end of the nipple and arranged upon the inner face of the wall 5 as clearly shown in Fig. 4 of the drawings. The other enlarged end of the connection or coupling 11 is inserted in one end of a flexible tube 13 of rubber or the like which has its other end engaged with a tubular post or projection 14 arranged upon the bottom of the chamber 3 and having at its lower end an opening 14$^a$ for the inlet of the milk within said chamber. From the foregoing it will be seen that when the pigs suck upon the nipples 9 the milk within the chamber 3 will be drawn upwardly through the parts 14, 13, 11, and into the nipples.

In order to warm the milk I provide in the chamber or compartment 4 a heater which is preferably in the form of an oil lamp 15. Said lamp is placed within an upright circular guard wall 16 arranged centrally in the chamber 4 and its chimney projects up into a chimney 17 which rises from the cover 7. The top of the chimney 17 is provided with a cap or cover 18 secured to its upper edge, which latter is notched as at 19 to permit of the escape of the heat and products of combustion from the lamp or heater. In the upper portion of the chimney beneath its cap 18 is arranged a guard or deflector 20 for the purpose of preventing the lamp from being blown out by a strong wind. This guard or deflector is in the form of a circular plate of less diameter than the chimney 17 and supported centrally therein upon cross bars 21. Air is supplied to the lamp to enable it to burn properly through vertical inlet pipes 22 one of which is arranged on each side of the chimney 17 and projects through the cover 7 and down into the chamber 4 to a point adjacent to its bottom.

From the foregoing description taken in connection with the accompanying drawings it is thought that the construction, use and advantages of the invention will be readily understood without a further explanation.

Having thus described my invention what I claim is:

1. A feeder comprising a receptacle having a feed chamber formed in its wall with apertures, nipples arranged in said apertures, stationary tubes arranged upon the bottom of said chamber and having their opposite ends open, couplings inserted in the inner ends of the nipples, rings surrounding the nipples to retain the couplings therein, and tubes having their ends engaged with the inner ends of the couplings and the upper ends of said stationary tubes.

2. A feeder comprising a receptacle having a vertical partition dividing it into a feed chamber and a heating chamber, the feed chamber having apertures formed in its wall, nipples arranged in said apertures, stationary tubes arranged upon the bottom of the feed chamber and having their opposite ends open, couplings inserted in the inner ends of the nipples, rings surrounding the nipples to retain the couplings therein, tubes having their upper ends engaged with the inner ends of the couplings and the upper ends of said stationary tubes, and a heater arranged in the heating chamber.

3. A feeder comprising a receptacle of substantially rectangular form having one of its longitudinal sides curved outwardly, said curved side being formed with apertures, a base projecting outwardly from the bottom of the receptacle and formed with apertures to receive fastenings, a longitudinally curved vertical partition extending from end to end of the receptacle and dividing it into a feed chamber and a heating chamber, nipples arranged in the apertures in the curved front side of the receptacle, stationary tubes upon the bottom of the feed chamber, said tubes being open at their opposite ends, connecting tubes between the inner ends of the nipples and the upper ends of the stationary tubes, an upright guard wall arranged centrally upon the bottom of the heating chamber, a heater within said guard wall, a removable cover upon the top of the receptacle adapted to close both of the chambers, fastening devices for said cover, a chimney projecting from the top of the cover and arranged above the guard wall in the heating chamber, a cap upon the chimney, and an air inlet pipe extending through the cover and having its lower end terminating close to the bottom of the heating chamber, substantially as described.

In testimony whereof I hereunto affix my signature in the presence of two witnesses.

FRANCES BELLE ESPY.

Witnesses:
J. R. LEAGUE,
W. A. McELHOEY.